(12) United States Patent
Chen et al.

(10) Patent No.: US 10,783,417 B2
(45) Date of Patent: *Sep. 22, 2020

(54) METHOD, APPARATUS, ELECTRONIC DEVICE AND COMPUTER STORAGE MEDIUM FOR GENERATING INFORMATION IDENTIFICATION CODES

(71) Applicant: ALIBABA GROUP HOLDING LIMITED, Grand Cayman (KY)

(72) Inventors: Ge Chen, Hangzhou (CN); Lingnan Shen, Hangzhou (CN); Bo Weng, Hangzhou (CN); Huifeng Jin, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,784

(22) Filed: Apr. 8, 2020

(65) Prior Publication Data

US 2020/0234096 A1 Jul. 23, 2020

Related U.S. Application Data

(63) Continuation of application No. 16/691,236, filed on Nov. 21, 2019.

(30) Foreign Application Priority Data

Nov. 22, 2018 (CN) .......................... 2018 1 1401893

(51) Int. Cl.
   *G06K 19/06* (2006.01)
   *H04L 9/08* (2006.01)
   *G06K 7/14* (2006.01)

(52) U.S. Cl.
   CPC ..... *G06K 19/06037* (2013.01); *G06K 7/1417* (2013.01); *H04L 9/0869* (2013.01)

(58) Field of Classification Search
   CPC ............ G06K 19/06037; G06K 7/1417; H04L 9/0869
   (Continued)

(56) References Cited

U.S. PATENT DOCUMENTS 6,141,794 A    10/2000  Dice et al.
7,159,770 B2 *  1/2007  Onozu ................... G06Q 20/20
                                                  235/383
(Continued)

FOREIGN PATENT DOCUMENTS

CN    102025716 B    4/2013
CN    106656993 A    5/2017
(Continued)

OTHER PUBLICATIONS

PCT International Search Report and the Written Opinion dated Feb. 11, 2020, issued in related International Application No. PCT/US2019/062670.

(Continued)

*Primary Examiner* — Paultep Savusdiphol (57) ABSTRACT

Methods, systems, and devices, including computer programs encoded on computer storage media, for generating information identification codes are provided. One of the methods includes: requesting a user's code generation seed from a code identifying party; receiving a first code generation seed from the code identifying party; and synchronizing the first code generation seed to a client of the user, for the user to generate an information identification code.

20 Claims, 4 Drawing Sheets

---

S101 — DETERMINING WHETHER A NETWORK OF A CLIENT IS AVAILABLE IN RESPONSE TO AN INFORMATION IDENTIFICATION CODE GENERATION REQUEST

S102 — OBTAINING A CACHED FIRST CODE GENERATION SEED WHEN THE NETWORK OF THE CLIENT IS UNAVAILABLE

S103 — GENERATING AN INFORMATION IDENTIFICATION CODE ACCORDING TO THE FIRST CODE GENERATION SEED (58) Field of Classification Search
USPC .......................................... 235/494, 487, 384
See application file for complete search history.

(56) References Cited

U.S. PATENT DOCUMENTS

| | | |
|---|---|---|
| 7,535,864 B2 | 5/2009 | Aramaki |
| 7,761,885 B2 | 7/2010 | Labrou et al. |
| 7,953,974 B2 | 5/2011 | Yamamura et al. |
| 8,966,276 B2 | 2/2015 | Nanopoulos et al. |
| 9,832,016 B2 | 11/2017 | Yang et al. |
| 10,032,163 B2 | 7/2018 | Ritorto et al. |
| 10,169,760 B2 | 1/2019 | Pourfallah et al. |
| 10,223,691 B2 | 3/2019 | Katzin et al. |
| 2005/0211771 A1* | 9/2005 | Onozu ................. G06Q 20/341 235/383 |
| 2006/0122931 A1 | 6/2006 | Walker et al. |
| 2007/0130472 A1 | 6/2007 | Buer et al. |
| 2007/0250541 A1 | 10/2007 | Takeda |
| 2012/0066120 A1 | 3/2012 | Ringewald et al. |
| 2014/0067675 A1* | 3/2014 | Leyva .............. G06Q 20/38215 705/44 |
| 2016/0112412 A1* | 4/2016 | Roth ........................ G06F 21/34 726/6 |
| 2018/0359635 A1* | 12/2018 | Lerner .................. H04L 9/3231 |
| 2019/0199701 A1* | 6/2019 | Lerner ...................... H04L 9/14 |
| 2019/0228277 A1* | 7/2019 | Baba ................ G06K 19/06037 |

FOREIGN PATENT DOCUMENTS

| | | |
|---|---|---|
| CN | 104168320 B | 1/2018 |
| CN | 108712383 A | 10/2018 |
| CN | 109146470 A | 1/2019 |

OTHER PUBLICATIONS

Non-Final Office Action dated Feb. 6, 2020, issued in related U.S. Appl. No. 16/691,236 (10 pages).

* cited by examiner

METHOD, APPARATUS, ELECTRONIC DEVICE AND COMPUTER STORAGE MEDIUM FOR GENERATING INFORMATION IDENTIFICATION CODES

CROSS-REFERENCE TO RELATED APPLICATION

This application is a continuation of U.S. patent application Ser. No. 16/691,236 filed on Nov. 21, 2019, and entitled "Method, Apparatus, Electronic Device and Computer Storage Medium for Generating Information Identification Codes," which claims priority to Chinese Patent Application No. 201811401893.5 filed on Nov. 22, 2018, and entitled "Method, Apparatus, Electronic Device and Computer Storage Medium for Generating Information Identification Codes," both of which are incorporated by reference herein in their entirety.

TECHNICAL FIELD

The specification relates to the field of computer technologies, particularly to a method, an apparatus, an electronic device and a computer storage medium for generating information identification codes.

BACKGROUND

With the development of Internet technologies, QR codes are increasingly being applied to various fields for unique identifications, such as payment QR codes, transportation QR codes, identification QR codes, coupon QR codes, card and ticket QR codes, and the like. Taking transportation QR codes as an example, with continuous promotion of Alipay™ transportation QR codes, Alipay™ transportation QR codes are supported in more and more cities. WeChat™, UnionPay™ and various local all-in-one card companies, bus companies and subway companies have also begun to develop a transportation QR code function. The Ministry of Transportation of the People's Republic of China has also promoted the industry to develop technical regulations for transportation QR codes. As a platform and channel, in addition to its own transportation QR code standards, Alipay™ also complies with the standards of the Ministry of Transportation and other local standards.

As the public transportation industry with using a transportation QR code is in an initial stage of internetization, the architecture and capacity of overall systems and networks may not be immediately adapted to the demand for high Internet traffic or a 24/7 service. This problem may be reflected in two aspects in practical applications. In one aspect, the reliability of a network of a user's transportation environment may be poor, and mobile phones often fail to connect to the network. When a user uses a network for the first time or has not been using a network for a long time, the transportation code function may be unavailable due to no service. In another aspect, systems and networks of the interaction parties such as bus, subway and all-in-one card companies are poorly available, often causing service failures, connection failures and the like, shutdown of a system due to insufficient system capacity at a typical activity peak, network disconnection during rush hours and even power outage, etc., which severely affects the use of a transportation QR code. Therefore, it is necessary to ensure that a user can normally generate an information identification code and perform corresponding operations, when the client fails to connect to a network; and/or when the availability of a system and a network of a code identifying party (such as a bus, a subway) is low.

SUMMARY

Embodiments of the specification provide a method, an apparatus, an electronic device and a computer storage medium for generating information identification codes.

In one aspect, the specification provides a method for generating information identification codes. The method may include: requesting a user's code generation seed from a code identifying party; receiving a first code generation seed from the code identifying party; and synchronizing the first code generation seed to a client of the user, for the user to generate information identification code.

In another aspect, the specification provides a non-transitory computer-readable storage medium for generating information identification codes. The non-transitory computer-readable storage medium may store instructions executable by one or more processors to cause the one or more processors to perform operations. The operations may include: requesting a user's code generation seed from a code identifying party; receiving a first code generation seed from the code identifying party; and synchronizing the first code generation seed to a client of the user, for the user to generate information identification code.

In yet another aspect, the specification further provides a method for generating information identification codes. The method may include: determining whether a network of a client is available; obtaining, when a network of the client is unavailable, a first code generation seed; and generating information identification code according to the first code generation seed.

In still another aspect, a method for generating information identification codes is provided in the specification. The method may include: determining whether a network of a client is available in response to an information identification code generation request; obtaining a first code generation seed when a network of the client is unavailable; wherein the first code generation seed is pre-synchronized to the client by a server; and generating the information identification code according to the first code generation seed.

The specification also provides an apparatus for generating information identification codes. The apparatus may include: a first response module, configured to determine whether a network of a client is available in response to an information identification code generation request; a first obtaining module, configured to obtain a first code generation seed when a network of the client is unavailable; wherein the first code generation seed is pre-synchronized to the client by a server; and a first generation module, configured to generate the information identification code according to the first code generation seed.

The specification provides another apparatus for generating information identification codes. The apparatus may include: a second response module, configured to request a user's code generation seed from a code identifying party in response to triggering of a preset service low-peak event; and a caching module, configured to store, e.g., cache, the code generation seed after receiving the code generation seed and synchronize the code generation seed to a client.

The specification provides a system for generating information identification codes. The system may include: a client for performing the method as described above; and/or a server for performing the method as described above.

The specification further provides an electronic device. The device may include one or more processors and one or more non-transitory computer-readable memories coupled to the one or more processors. The memories are configured with instructions executable by the one or more processors to perform operations. The operations may include: requesting a user's code generation seed from a code identifying party; receiving a first code generation seed from the code identifying party; and synchronizing the first code generation seed to a client of the user, for the user to generate an information identification code.

In the specification, a server requests a user's code generation seed from a code identifying party within a predetermined time period, and synchronizes the code generation seed to the client. The client stores, e.g. caches, after receiving the code generation seed, and when an information identification code needs to be generated by corresponding operations, a first code generation seed cached in a local client may be used to generate an information identification code if a network of the client is unavailable. In this way, the embodiments of the specification can provide services in the case where a client has no network or external interaction parties are disconnected from the network. The specification can greatly improve the availability of an information identification code and enhance the user's experience.

It should be understood that the foregoing general description and the following detailed description are illustrative and explanatory and not restrictive to the specification.

BRIEF DESCRIPTION OF THE DRAWINGS

With reference to the attached drawings, other features, objectives and advantages of the specification will become more apparent according to the detailed description of non-restrictive implementation manners below.

DETAILED DESCRIPTION

Exemplary implementation manners of the specification will be described in detail hereinafter with reference to the attached drawings so that those skilled in the art may easily implement the exemplary implementation manners. In addition, portions that are not related to the description of the exemplary implementation manners are omitted in the attached drawings for the sake of clarity.

In the specification, it should be understood that the terms such as "comprising" or "with" are intended to indicate the presence of features, numbers, steps, acts, components, parts or combinations thereof disclosed in the specification and are not intended to exclude the possibility of the presence or addition of one or a plurality of other features, numbers, steps, acts, components, parts or combinations thereof.

The embodiments of the specification and features of the embodiments may be combined with each other in case of no conflict. The specification will be described in detail below with reference to the drawings and embodiments.

Figure 1:
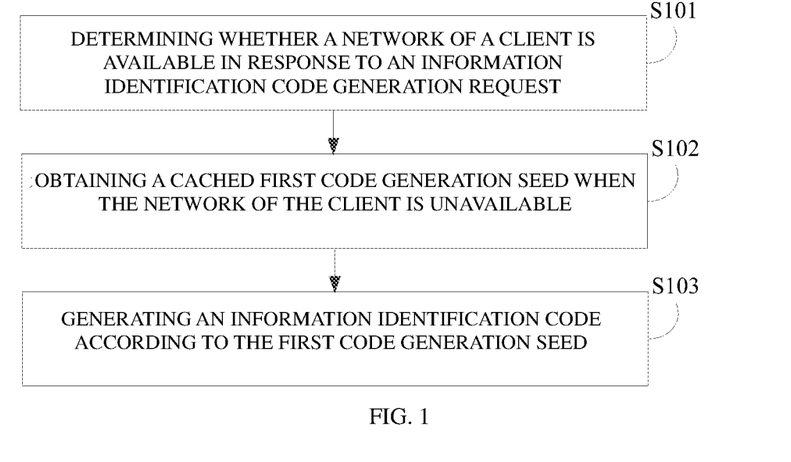
FIG. 1 illustrates a flow chart of a method for generating information identification codes on a client according to an embodiment of the specification.

FIG. 1 shows a flow chart of a method for generating information identification codes according to an embodiment of the specification. The method for generating information identification codes may be implemented on a client. As shown in FIG. 1, the method for generating information identification codes comprises the following steps of S101 to S103.

In step S101, whether a network of a client is available is determined in response to an information identification code generation request.

In step S102, a first code generation seed is obtained when a network of the client is unavailable. The first code generation seed is pre-synchronized to the client by a server, and is stored at the client. In some embodiments, the first code generation seed is cached at the client.

In step S103, the information identification code is generated according to the first code generation seed.

In this embodiment, when information identification code is requested, such as for shopping, taking a bus, etc., a user may request to generate an information identification code through an application such as Alipay™ and the like on a client. An information identification code may be a dynamic QR code, such as a payment QR code, a transportation QR code, an identity QR code, or a unique identification code of other information such as a card, a ticket, a coupon, etc. For information security, an information identification code may vary with time. However, the information identification code may uniquely identify corresponding information, such as a payer's account number, a payer's transportation card, identity information, a card number, a ticket number, a coupon number, etc. The information identification code may ensure that corresponding information will not be leaked. In the following description, the payment QR code is taken as an example, however, the information identification code proposed by the specification is not limited to a payment QR code and may also be applied to other information identification codes, such as a transportation QR code, an identity QR code, etc. After receiving an information identification code generation request, an application on a client first determines whether a network of the client is available. In some embodiments, the network is a local network of the client. If not available, a first code generation seed stored, e.g. cached, locally may be obtained and the first code generation seed may be used to generate an information identification code to be displayed on a screen of the client. The first code generation seed may be pre-obtained by a server of an application from a code identifying party such as a bus, a subway, a merchant and the like and then synchronized to the client. In some embodiments, the code identifying party is a party with the right to interpret information. In some other embodiments, the code identifying party is a party with the ownership of information. In still other embodiments, the code identifying party may identify to which piece of information an information identification code corresponds, and may allow or prohibit corresponding operations to the information according to a request of an application. The first code generation seed may include one or more of the user's identity and debit card number, effective time range of the first code generation seed, a public key and the like. The application may generate a valid information identification code based on the first code generation seed so as to be recognized by a code scanning device.

In some embodiments, the server may pre-synchronize the code generation seed to the client, and the client caches after receiving the code generation seed, and when an information identification code needs to be generated by corresponding operations, the first code generation seed cached in a local client may be used to generate the information identification code if a network of the client is unavailable. In this way, the embodiments of the specification can provide service in the case where the client has no network or external interaction parties are disconnected from the network. The specification can greatly improve the availability of an information identification code and enhance the user's experience. The specification uses cache as an example. A person having ordinary in the art should understand that the code generation seed or other data can be stored in other memories, like a main memory of a computing device.

Figure 2:
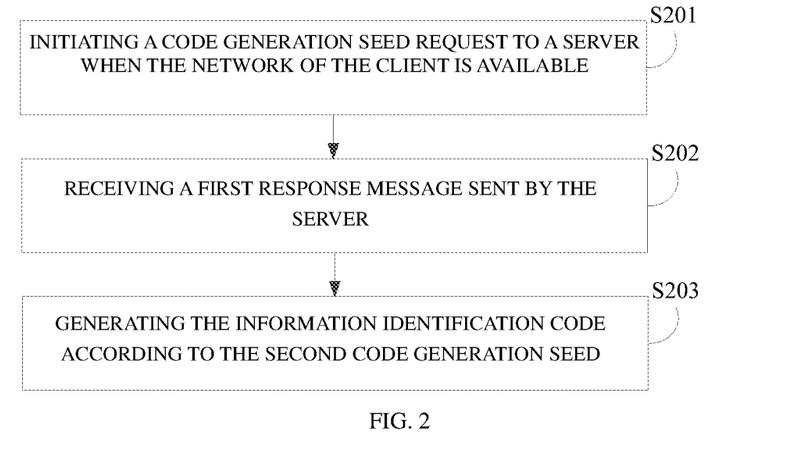
FIG. 2 illustrates a flow chart of a process when a network of a client is available in a method for generating information identification codes according to an embodiment of the specification.

In one embodiment, as shown in FIG. 2, after step S101, the method further comprises the following steps of S201 to S203.

In step S201, a code generation seed request to the server is initiated when the network of the client is available.

In step S202, a first response message sent by the server is received. The first response message includes a second code generation seed.

In step S203, the information identification code is generated according to the second code generation seed.

When an application receives a request that the user needs to generate an information identification code, if a network of the client is available, a code generation seed request may be initiated to the server in order to obtain the latest code generation seed. After receiving the code generation seed request from the client, the server may send the latest second code generation seed, and the application on the client generates an information identification code based on the latest second code generation seed. As such, if a network of the client is available, the latest code generation seed can be obtained in real time by an asynchronous request, thereby guaranteeing the success rate of operations such as payment and the like.

Figure 3:
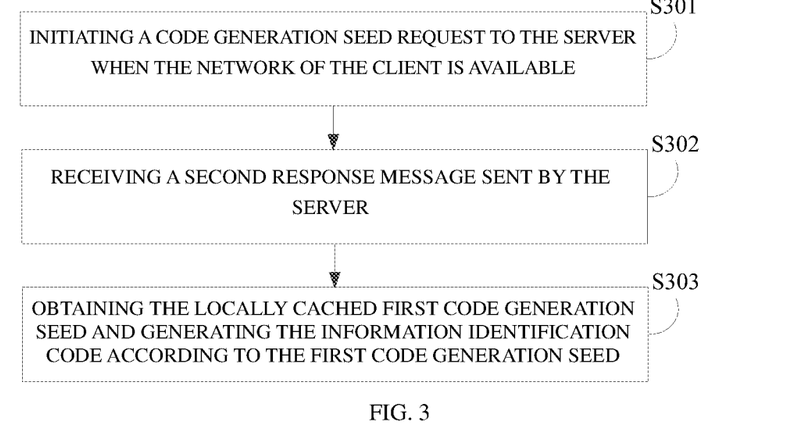
FIG. 3 illustrates a flow chart of another process when a network of a client is available in a method for generating information identification codes according to an embodiment of the specification.

In another embodiment, as shown in FIG. 3, after step S101, the method further comprises the following steps of S301 to S303.

In step S301, a code generation seed request to the server is initiated when the network of the client is available.

In step S302, a second response message sent by the server is received. The second response message includes an instruction for using the locally cached first code generation seed.

In step S303, the locally cached first code generation seed is obtained and the information identification code is generated according to the first code generation seed.

When an application receives a request that the user needs to generate an information identification code, if the network of the client is available, a code generation seed request may be initiated to the server so as to obtain the latest code generation seed. After receiving a code generation seed request from the client, the server determines whether a code generation seed latest synchronized to the client is available. If available, the server may send a second response message to instruct the application to generate an information identification code by using the locally cached first code generation seed. If the code generation seed cached in the client is unavailable, the latest code generation seed may be obtained from the code identifying party, and then the latest code generation seed is sent to the client. As such, if the code generation seed cached in the client is available, there is no need to request the latest code generation seed from the code identifying party, and the code generation seed locally cached in the client may be directly used. This can not only save resources but also ensure the real-time performance of operations such as payment and the like, so as to improve user's experience when a system or network of the code identifying party is poor in availability.

Figure 4:
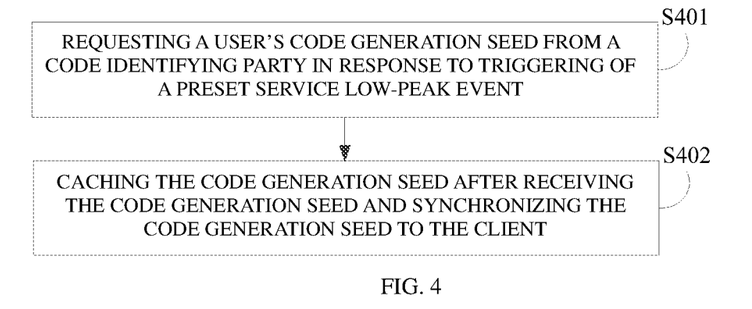
FIG. 4 illustrates a flow chart of a method for generating information identification codes on a server according to an embodiment of the specification.

FIG. 4 shows a flow chart of a method for generating information identification codes according to another embodiment of the specification. The method for generating information identification codes may be implemented on a server. As shown in FIG. 4, the method for generating information identification codes comprises the following steps of S401 to S402.

In step S401, a user's code generation seed is requested from a code identifying party in response to triggering of a preset event. The preset event may be a preset service low-peak event.

In step S402, the code generation seed is cached and synchronized to a client.

The server may request a user's code generation seed from the code identifying party within a predetermined time period. The predetermined time period may be, for example, a preset low-peak period of service, thereby avoiding a peak period of service and alleviating pressure on the server and the code identifying party's system to prevent affecting normal service of the user.

In one embodiment, a fixed time period may be set according to experience and the like as a low-peak period of service. In another embodiment, traffic volume may be monitored to determine whether it is a low-peak period of service. When the traffic volume is lower than a preset threshold, it may be considered as a low-peak period of service. When a low-peak period of service is determined, the server triggers a service low-peak event.

In another embodiment, for a plurality of users within a preset user group, a server may obtain the users' code generation seeds from the code identifying party. The preset user group may be a group of users that includes all registered users, active users according to statistics, users with frequent errors in a network of a client according to statistics or the like. It may be set according to actual situations and is not limited herein.

After receiving the code generation seed sent by the code identifying party, the server may store the code generation seed on the server and synchronize the code generation seed to the client, thereby ensuring that the most recently obtained code generation seed is cached on the client. In some embodiments, the received code generation seed may be cached on the server.

For example, the server requests a user's code generation seed from a merchant, i.e., the code identifying party, and synchronizes the code generation seed to a client so that the client caches the code generation seed after receiving the code generation seed. When an information identification code needs to be generated for payment, the first code generation seed cached in the local client may be used to generate an information identification code if the network of the client is unavailable. In this way, the embodiments of the specification can provide services to in the case where the client has no network or external interaction parties are disconnected from the network. The specification can greatly improve the availability of the information identification code and enhance the user's experience. Meanwhile, normal services will not be affected as the server may request the user's code generation seed in batches from the code identifying party during a low-peak period of service.

Figure 5:
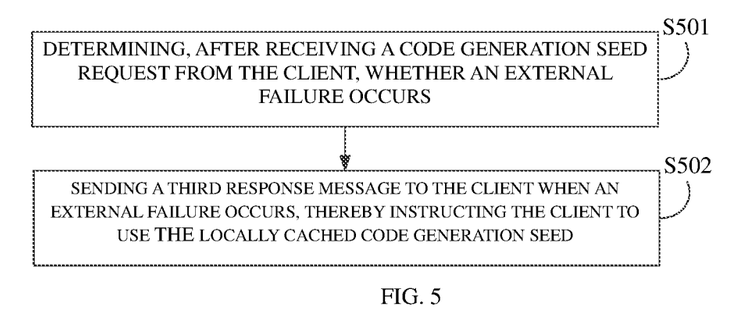
FIG. 5 illustrates a flow chart of a process in case of failure of a code identifying party in a method for generating information identification codes according to an embodiment of the specification.

In yet another embodiment, as shown in FIG. 5, the method further comprises the following steps of S501 to S502.

In step S501, after receiving a code generation seed request from the client, whether an external failure occurs is determined. The external failure is associated with loss of connection with the code identifying party.

In step S502, a third response message is sent to the client when an external failure occurs, instructing the client to use the locally cached code generation seed.

The client may request the latest code generation seed from the server when needed. After receiving the user's code generation seed request, the server can first determine whether the code identifying party may be connected. In other words, the server may determine whether the latest code generation seed may be obtained from the code identifying party. For example, if the code identifying party fails to connect with the server due to a system or connection failure of the code identifying party, the server may send a third response message to the client, instructing the client to use the locally cached code generation seed. In this way, the user can still use an information identification code to perform corresponding operations when the system or network of the code identifying party is unavailable.

Figure 6:
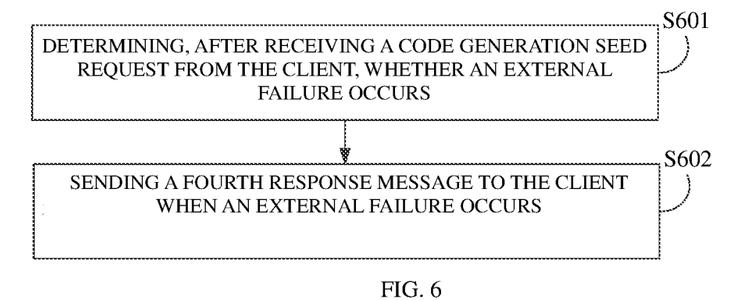
FIG. 6 illustrates a flow chart of another process in case of a failure of a code identifying party in a method for generating information identification codes according to an embodiment of the specification.

In still another embodiment, as shown in FIG. 6, the method further comprises the following steps of S601 to S602.

In step S601, after receiving a code generation seed request from the client, whether an external failure occurs is determined. The external failure is associated with loss of connection with the code identifying party.

In step S602, a fourth response message is sent to the client when an external failure occurs. The fourth response message includes the code generation seed.

The client may request the latest code generation seed from the server when needed. After receiving the user's code generation seed request, the server may first determine whether the code identifying party can be connected. If the server determines that the code identifying party cannot be connected due to an external failure, the server may send the code generation seed cached in the server to the client, so that the client generates an information identification code by using the code generation seed cached in the server. As such, a client will not be prevented from generating a valid information identification code in the event of a failure, and the code generation seed cached in the server may be more secure than that cached in the client, thereby making the code generation seed received by the client more effective.

In some embodiments, if an external failure has occurred and the code identifying party cannot be connected, the server may first determine whether a code generation seed locally cached in the client is available (for example, a code generation seed is still valid but fails to be updated by the code identifying party, etc.). If available, the user is instructed to use the locally cached code generation seed to save resources. If a code generation seed locally cached in the client is unavailable and a code generation seed cached in a server is available (for example, the mostly recently obtained code generation seed is not successfully synchronized to the client, etc.), the code generation seed cached in the server may be sent to the client, so that the client generates an information identification code by using the code generation seed.

The following are embodiments of an apparatus of the specification, which may be used to implement embodiments of the method of the specification.

Figure 7:
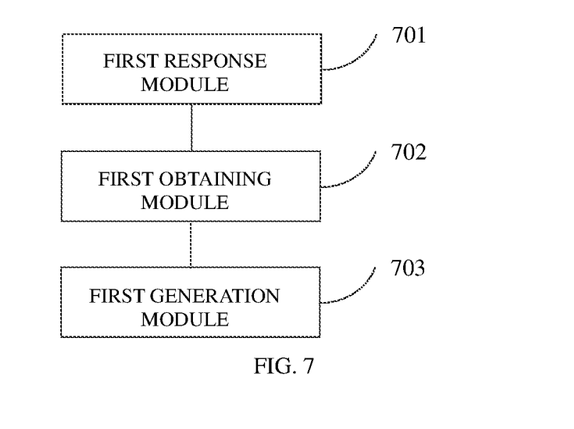
FIG. 7 illustrates a structural block diagram of an apparatus for generating information identification codes on a client according to an embodiment of the specification.

FIG. 7 is a structural block diagram of an apparatus for generating information identification codes according to an embodiment of the specification, wherein the apparatus may be implemented as part or all of an electronic device by software, hardware, or a combination of both. As shown in FIG. 7, the apparatus for generating information identification codes comprises: a first response module 701, configured to determine whether a network of a client is available in response to an information identification code generation request; a first obtaining module 702, configured to obtain a cached first code generation seed when the network of the client is unavailable; wherein the first code generation seed is pre-synchronized to the client by a server; and a first generation module 703, configured to generate the information identification code according to the first code generation seed.

When an information identification code is requested for such as shopping, taking a bus, etc., a user may request to generate an information identification code through an application such as Alipay™ and the like on a client. The information identification code may be a dynamic QR code, such as a payment QR code, a transportation QR code, an identity QR code, or a unique identification code of other information such as a card, a ticket, a coupon, etc. For information security, the information identification code may vary with time. The information identification code may uniquely identify corresponding information, such as a payer's account number, a payer's transportation card, identity information, a card number, a ticket number, a coupon number, etc. The information identification code may ensure that corresponding information will not be leaked. In the following description, the payment QR code is taken as an example, however, the information identification code proposed by the specification is not limited to the payment QR code and may also be applied to other information identification codes as mentioned above. After receiving the information identification code generation request, the application on the client first determines whether the network of the client is available. If not available, the first code generation seed cached locally may be obtained and the first code generation seed may be used to generate an information identification code to be displayed on a screen of the client. The first code generation seed may be pre-obtained by the server of the application from a code identifying party such as a bus, a subway, a merchant and the like and then synchronized to the client. The code identifying party is a party with the right to interpret information. In some embodiments, the code identifying party may be a party with the ownership of information, may identify to which piece of information the information identification code corresponds, and may allow or prohibit corresponding operations to the information according to the request of the application. The first code generation seed may include the user's identity and debit card number, effective time range of a first code generation seed, a public key and the like. The application may generate a valid information identification code based on the first code generation seed so as to be recognized by a code scanning device.

In some embodiments, the server may pre-synchronize the code generation seed to the client, and the client caches the code generation seed after receiving the code generation seed. When an information identification code needs to be generated by corresponding operations, the first code generation seed cached in the local client may be used to generate the information identification code if the network of the client is unavailable. In this way, the embodiments of the specification can provide service in the case where a client has no network or external interaction parties are disconnected from the network. The specification can greatly improve the availability of the information identification code and enhance the user's experience.

Figure 8:
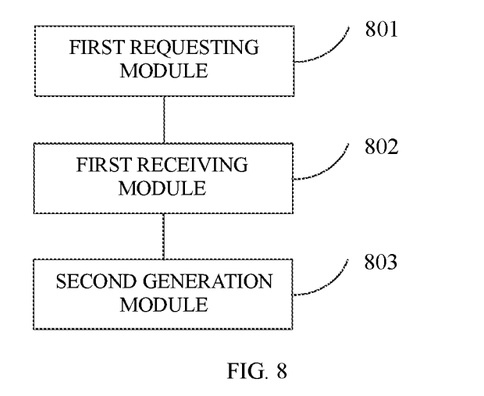
FIG. 8 illustrates a structural block diagram of a process when a network of a client is available in an apparatus for generating information identification codes according to an embodiment of the specification.

In one embodiment, as shown in FIG. 8, the apparatus further comprises: a first requesting module 801, configured to initiate a code generation seed request to the server when the network of the client is available; a first receiving module 802, configured to receive a first response message sent by the server, wherein the first response message includes a second code generation seed; and a second generation module 803, configured to generate the information identification code according to the second code generation seed.

When the application receives the request that the user needs to generate an information identification code, if the network of the client is available, a code generation seed request may also be initiated to the server in order to obtain the latest code generation seed. After receiving the code generation seed request from a client, the server may send the latest second code generation seed, and the application on the client generates an information identification code based on the latest second code generation seed. As such, if the network of the client is available, the latest code generation seed is still obtained in real time by an asynchronous request, thereby guaranteeing the success rate of operations such as payment and the like.

Figure 9:
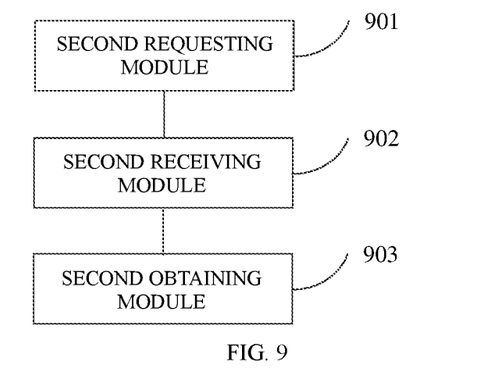
FIG. 9 illustrates a structural block diagram of another process when a network of a client is available in an apparatus for generating information identification codes according to an embodiment of the specification.

In another embodiment, as shown in FIG. 9, the apparatus further comprises: a second requesting module 901, configured to initiate a code generation seed request to the server when the network of the client is available; a second receiving module 902, configured to receive a second response message sent by the server, wherein the second response message includes an instruction for using the locally cached first code generation seed; and a second obtaining module 903, configured to obtain the locally cached first code generation seed and generate the information identification code according to the first code generation seed.

When the application receives a request that the user needs to generate an information identification code, if the network of the client is available, a code generation seed request may also be initiated to the server in order to obtain the latest code generation seed. After receiving the code generation seed request from the client, the server determines whether a code generation seed latest synchronized to the client is available. If available, the server may send a second response message to instruct the application to generate an information identification code by using the locally cached first code generation seed. If the code generation seed cached in the client is unavailable, the latest code generation seed may be obtained from a code identifying party, and sent to the client. As such, if the code generation seed cached in the client is available, there is no need to request the latest code generation seed from the code identifying party, and the code generation seed locally cached in the client may be directly used, which can not only save resources but also ensure the real-time performance of operations such as payment and the like and improve the user's experience when a system or network of the code identifying party is poor in availability.

Figure 10:
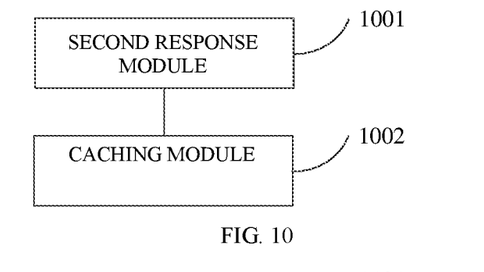
FIG. 10 illustrates a structural block diagram of an apparatus for generating information identification codes on a server according to an embodiment of the specification.

FIG. 10 shows a structural block diagram of an apparatus for generating information identification codes according to another embodiment of the specification. The apparatus for generating information identification codes is installed on a server. As shown in FIG. 10, the apparatus for generating information identification codes comprises: a second response module 1001, configured to request a user's code generation seed from a code identifying party in response to triggering of a preset service low-peak event; and a caching module 1002, configured to cache the code generation seed after receiving the code generation seed and synchronize the code generation seed to the client.

The server may request the user's code generation seed from the code identifying party within a predetermined time period. The predetermined time period may be, for example, a preset low-peak period of service, thereby avoiding peak period of service and alleviating pressure on the server and the code identifying party's system to prevent from affecting normal service of the user.

In one embodiment, a fixed time period may be set according to experience and the like as a low-peak period of service. In another embodiment, traffic volume may be monitored to determine whether it is a low-peak period of service. When the traffic volume is lower than a preset threshold, it may be considered as a low-peak period of service. When a low-peak period of service is determined, the server triggers a service low-peak event.

In another embodiment, for a plurality of users within a preset user group, a server may obtain the users' code generation seeds from the corresponding code identifying parties. The preset user group may be a group of users that includes all registered users, active users according to statistics, users with frequent errors in a network of a client according to statistics or the like. It may be set according to actual situations and is not limited herein.

After receiving the code generation seed sent by the code identifying party, the server may cache the code generation seed on the server and synchronize the code generation seed to the client, thereby ensuring that the most recently obtained code generation seed is cached on the client.

For example, the server requests a user's code generation seed from a merchant, i.e., the code identifying party, and synchronizes the code generation seed to the client so that the client caches the code generation seed after receiving the code generation seed; and when an information identification code needs to be generated for payment, the code generation seed cached in the local client may be used to generate an information identification code if the network of the client is unavailable. In this way, the embodiments of the specification can provide services in the case where a client has no network or external interaction parties are disconnected from the network. The specification can greatly improve the availability of the information identification code and enhance the user's experience. Meanwhile, normal service will not be affected as the server may request the user's code generation seed in batches from the code identifying party during low-peak period of service.

Figure 11:
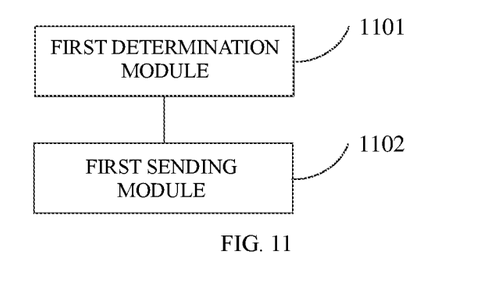
FIG. 11 illustrates a structural block diagram of a process of an apparatus for generating information identification codes in case of a failure of a code identifying party according to another embodiment of the specification.

In yet another embodiment, as shown in FIG. 11, the apparatus further comprises: a first determination module 1101, configured to determine, after receiving a code generation seed request from the client, whether an external failure occurs; wherein the external failure is associated with loss of connection with the code identifying party; and a first sending module 1102, configured to send a third response message to the client when an external failure occurs, instructing the client to use the locally cached code generation seed.

The client may request the latest code generation seed from the server when needed. After receiving the user's code generation seed request, the server may first determine whether a code identifying party may be connected, that is, whether the latest code generation seed may be obtained from the code identifying party. For example, if the code identifying party fails to connect with the server due to system or connection failure of the code identifying party, the server may send a third response message to the client, instructing the client to use the locally cached code generation seed. In this way, a user can still use the information identification code to pay when the system or network of the code identifying party is unavailable.

Figure 12:
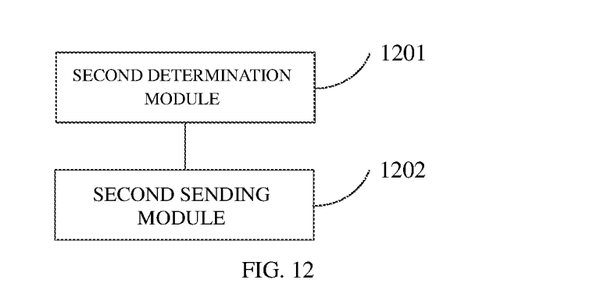
FIG. 12 illustrates a structural block diagram of another process of an apparatus for generating information identification codes in case of a failure of a code identifying party according to an embodiment of the specification.

In still another embodiment, as shown in FIG. 12, the apparatus further comprises: a second determination module 1201, configured to determine, after receiving a code generation seed request from the client, whether an external failure occurs; wherein the external failure is associated with loss of contact with the code identifying party; and a second sending module 1202, configured to send a fourth response message to the client when an external failure occurs; wherein the fourth response message includes the code generation seed.

The client may request the latest code generation seed from the server when needed. After receiving the user's code generation seed request, the server may first determine whether a code identifying party can be connected. If a server determines that the code identifying party cannot be connected due to an external failure, the server may send the code generation seed cached in the server to the client, so that the client generates an information identification code by using the code generation seed cached in the server. In this way, the client will not be prevented from generating a valid information identification code in the event of the external failure. The code generation seed cached in the server may be more secure than that cached in the client, thereby making the code generation seed received by the client more effective.

In still another embodiment, if an external failure has occurred and a code identifying party cannot be connected, the server may first determine whether the code generation seed locally cached in the client is available (for example, the code generation seed is still valid but fails to be updated by the code identifying party, etc.). If available, the user is instructed to use the locally cached code generation seed to save resources. If the code generation seed locally cached in the client is unavailable and the code generation seed cached in the server is available (for example, the mostly recently obtained code generation seed is not successfully synchronized to the client, etc.), the code generation seed cached in the server may be sent to the client, so that the client generates the information identification code by using the code generation seed.

The specification further provide a system for generating information identification codes, comprising: a client, configured to execute the method for generating information identification codes as described in FIG. 1 and related embodiments; and/or a server, configured to execute the method for generating information identification codes as described in FIG. 4 and related embodiments.

Figure 13:
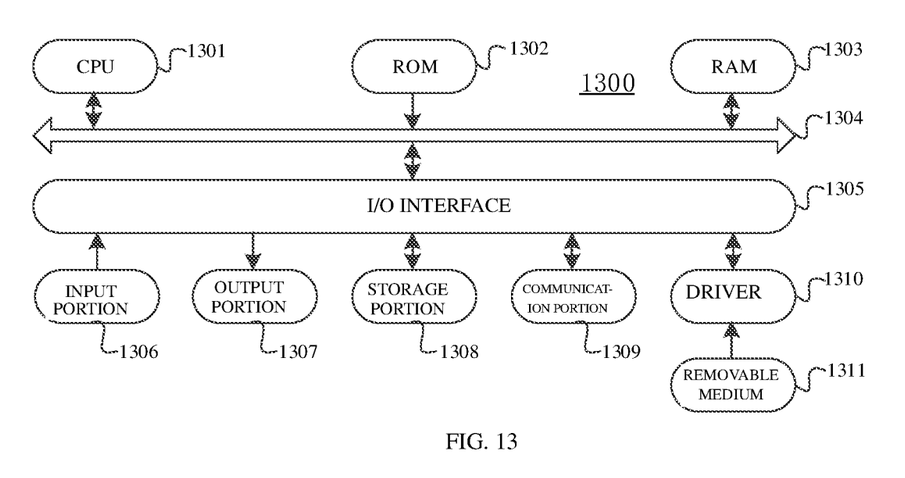
FIG. 13 is a schematic structural diagram of an electronic device for generating information identification codes according to an embodiment of the specification.

FIG. 13 shows a schematic diagram of a structure of an electronic device suitable for implementing the method for generating information identification codes according to the implementation manners of the specification.

As shown in FIG. 13, the electronic device 1300 comprises a central processing unit (CPU) 1301, which may execute one or more processes in the implementation manners as shown in FIG. 1 according to a program stored in a read only memory (ROM) 1302 or a program loaded into a random access memory (RAM) 1303 from a storage portion 1308. In the RAM 1303, various programs and data required for operations of the electronic device 1300 are also stored. The CPU 1301, the ROM 1302 and the RAM 1303 are connected to each other through a bus 1304. An input/output (I/O) interface 1305 is also connected to the bus 1304.

The following components are connected to the I/O interface 1305: an input portion 1306 including a keyboard, a mouse and the like; an output portion 1307 including a cathode ray tube (CRT), a liquid crystal display (LCD), a speaker and the like; a storage portion 1308 including a hard disk and the like; and a communication portion 1309 of a network interface card including a LAN card, a modem and the like. The communication portion 1309 performs communication processing via a network such as the Internet. A driver 1310 is also connected to the I/O interface 1305 as needed. A removable medium 1311 such as a magnetic disk, an optical disk, a magneto-optical disk, a semiconductor memory and the like is installed on the drive 1310 as needed so that a computer program read therefrom is installed into the storage portion 1308 as needed.

In some embodiments, the method described above with reference to FIG. 1 may be implemented as a computer software program. For example, the implementation manners of the specification include a computer program product, comprising a computer program tangibly embodied on a readable medium, wherein the computer program comprises a program code for performing the method as shown in FIG. 1. In some embodiments, the computer program may be downloaded and installed from a network via the communication portion 1309, and/or be installed from the removable medium 1311.

Flowcharts and block diagrams in the attached drawings illustrate architectures, functions and operations which are possible to be implemented by systems, methods and computer program products in accordance with various implementation manners of the specification. In this regard, each block in flow charts or block diagrams may represent a module, a program segment, or a portion of code, wherein the module, the program segment, or the portion of code includes one or a plurality of executable instructions for implementing regulated logical functions. It should also be noted that in some alternative implementations, functions noted in the blocks may also occur in a different order than that illustrated in the attached drawings. For example, in fact two successively represented blocks may be executed substantially in parallel or may sometimes be executed in the reverse order, depending on involved functions. It should also be noted that each block of the block diagrams and/or flow charts, and a combination of blocks in the block diagrams and/or flow charts, may be implemented by a dedicated hardware-based system that performs specified functions or operations or by a combination of dedicated hardware and a computer instruction.

Units or modules as described in the implementation manners of the specification may be implemented by software or by hardware. The described units or modules may also be provided in a processor, and the names of the units or modules do not in a certain condition constitute a limitation to the units or modules themselves.

In a further aspect, the specification further provides a computer readable storage medium, which may be a computer readable storage medium included in the apparatus in the above implementation manner or a computer readable storage medium that exists separately and is not assembled into a device. A computer readable storage medium stores one or a plurality of programs that are used by one or a plurality of processors to perform the methods as described in the specification.

The above description only describes preferred embodiments of the specification and principles of applied technologies. It should be understood by those skilled in the art that the scope of the invention referred to in the specification is not limited to the technical solutions formed by a specific combination of the above technical features but also includes other technical solutions formed by any combination of the above technical features or their equivalent features without departing from the inventive concept, such as technical solutions formed by mutual replacement of the above features and technical features with similar functions disclosed (but not limited to) in the specification.

What is claimed is:

1. A server, comprising:
   one or more processors; and
   a non-transitory computer-readable storage medium for generating information identification code, storing instructions executable by the one or more processors to cause the one or more processors to perform operations comprising:
      receiving a code generation seed from a code identifying party;
      caching the code generation seed on the server;
      receiving a code generation seed request from a client; and
      responsive to a failure, sending, to the client, a response message including the code generation seed cached on the server for the client to generate an information identification code using the code generation seed, wherein the failure is associated with loss of connection with the code identifying party.

2. The server according to claim 1, wherein the receiving a code generation seed from the code identifying party comprises:
   obtaining the code generation seed within a predetermined time period.

3. The server according to claim 1, wherein the operations further comprise, before receiving the code generation seed from the code identifying party:
   requesting the code generation seed from the code identifying party.

4. The server according to claim 3, wherein before requesting the user's code generation seed from the code identifying party, the operations further comprise:
   triggering a preset service low-peak event.

5. The server according to claim 3, wherein the requesting a user's code generation seed from a code identifying party comprises:
   requesting code generation seeds of one or more users in a predetermined group, wherein the predetermined group includes a plurality of registered users, active users, or users with network errors.

6. The server according to claim 1, wherein the operations further comprise:
   when determining the failure occurs, sending a response message to the client, the response message comprising an instruction to use a locally cached code generation seed.

7. The server according to claim 1, wherein the operations further comprise:
   synchronizing the code generation seed to the client.

8. A non-transitory computer-readable storage medium for generating information identification code, storing instructions executable by one or more processors to cause the one or more processors to perform operations comprising:
   receiving a code generation seed from a code identifying party;
   caching the code generation seed on a server;
   receiving a code generation seed request from a client; and
   responsive to a failure, sending, to the client, a response message including the code generation seed cached on the server for the client to generate an information identification code using the code generation seed, wherein the failure is associated with loss of connection with the code identifying party.

9. The non-transitory computer-readable storage medium according to claim 8, wherein the receiving a code generation seed from the code identifying party comprises:
   obtaining the code generation seed within a predetermined time period.

10. The non-transitory computer-readable storage medium according to claim 8, wherein the operations further comprise, before receiving the code generation seed from the code identifying party:
    requesting the code generation seed from the code identifying party.

11. The non-transitory computer-readable storage medium according to claim 10, wherein before requesting the user's code generation seed from the code identifying party, the operations further comprise:
    triggering a preset service low-peak event.

12. The non-transitory computer-readable storage medium according to claim 10, wherein the requesting a user's code generation seed from a code identifying party comprises:
    requesting code generation seeds of one or more users in a predetermined group, wherein the predetermined group includes a plurality of registered users, active users, or users with network errors.

13. The non-transitory computer-readable storage medium according to claim 8, wherein the operations further comprise:
  when determining the failure occurs, sending a response message to the client, the response message comprising an instruction to use a locally cached code generation seed.

14. The non-transitory computer-readable storage medium according to claim 8, wherein the operations further comprise:
  synchronizing the code generation seed to the client.

15. A method, implemented by a server, comprising:
  receiving a code generation seed from a code identifying party;
  caching the code generation seed on the server;
  receiving a code generation seed request from a client; and
  responsive to a failure, sending, to the client, a response message including the code generation seed cached on the server for the client to generate an information identification code using the code generation seed, wherein the failure is associated with loss of connection with the code identifying party.

16. The method according to claim 15, wherein the receiving a code generation seed from the code identifying party comprises:
  obtaining the code generation seed within a predetermined time period.

17. The method according to claim 15, further comprising, before receiving the code generation seed from the code identifying party:
  requesting the code generation seed from the code identifying party.

18. The method according to claim 17, wherein before requesting the user's code generation seed from the code identifying party, the method further comprises:
  triggering a preset service low-peak event.

19. The method according to claim 17, wherein the requesting a user's code generation seed from a code identifying party comprises:
  requesting code generation seeds of one or more users in a predetermined group, wherein the predetermined group includes a plurality of registered users, active users, or users with network errors.

20. The method according to claim 15, further comprising:
  when determining an external failure occurs, sending a response message to the client, the response message comprising an instruction to use a locally cached code generation seed.

\* \* \* \* \*